United States Patent
Schultz

(10) Patent No.: US 8,208,047 B2
(45) Date of Patent: Jun. 26, 2012

(54) IMAGER AND IMAGING METHOD FOR DIGITAL CINEMATOGRAPHY

(75) Inventor: Mark Alan Schultz, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 293 days.

(21) Appl. No.: 12/086,447

(22) PCT Filed: Dec. 18, 2006

(86) PCT No.: PCT/US2006/048217
§ 371 (c)(1),
(2), (4) Date: Jun. 12, 2008

(87) PCT Pub. No.: WO2007/075552
PCT Pub. Date: Jul. 5, 2007

(65) Prior Publication Data
US 2009/0278947 A1 Nov. 12, 2009

Related U.S. Application Data

(60) Provisional application No. 60/751,336, filed on Dec. 16, 2005.

(51) Int. Cl.
*H04N 5/225* (2006.01)
*H04N 9/09* (2006.01)
*H04N 9/097* (2006.01)

(52) U.S. Cl. ........................................ 348/262
(58) Field of Classification Search .................. 348/262
See application file for complete search history.

(56) References Cited

U.S. PATENT DOCUMENTS

| | | | |
|---|---|---|---|
| 5,386,228 A * | 1/1995 | Okino | 348/218.1 |
| 2001/0033701 A1* | 10/2001 | Okisu et al. | 382/284 |

FOREIGN PATENT DOCUMENTS

| | | |
|---|---|---|
| EP | 1037458 | 9/2000 |
| EP | 1223555 | 7/2002 |
| JP | 7-87370 | 3/1995 |
| JP | 7087370 | 3/1995 |

OTHER PUBLICATIONS

Search Report Dated June 1, 2007.

* cited by examiner

*Primary Examiner* — Sinh Tran
*Assistant Examiner* — Jason Flohre
(74) *Attorney, Agent, or Firm* — Robert D. Shedd; Harvey D. Fried; Richard LaPeruta

(57) ABSTRACT

The invention provides an imager and imaging method for forming, on a plurality of photo-elements, an optical image of an object lying in a viewing plane defined by horizontal and vertical viewing axes. The imager comprises at least first, second and third video image sensors. Each video image sensor comprises a corresponding array of photoelements. The photoelements are arranged in rows and columns to define a first pixel resolution for each array. A lens is configured to focus at least a portion of light from the object onto the arrays. The arrays are arranged with respect to the lens such that the rows are aligned along a vertical axis of the viewing plane. The columns are aligned along a horizontal axis of the viewing plane. An optical image of the object is formed. The image comprises a second pixel resolution higher than the first pixel resolution.

10 Claims, 6 Drawing Sheets

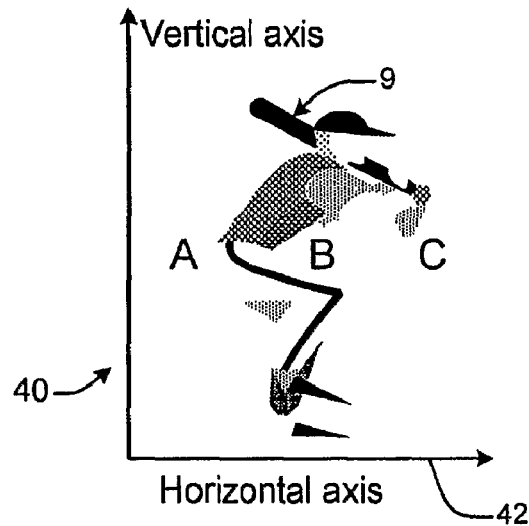
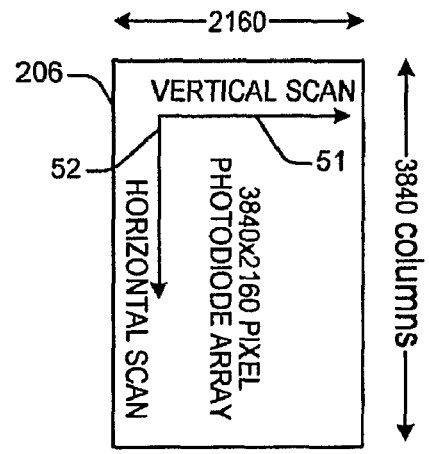
FIG. 4A FIG. 4B
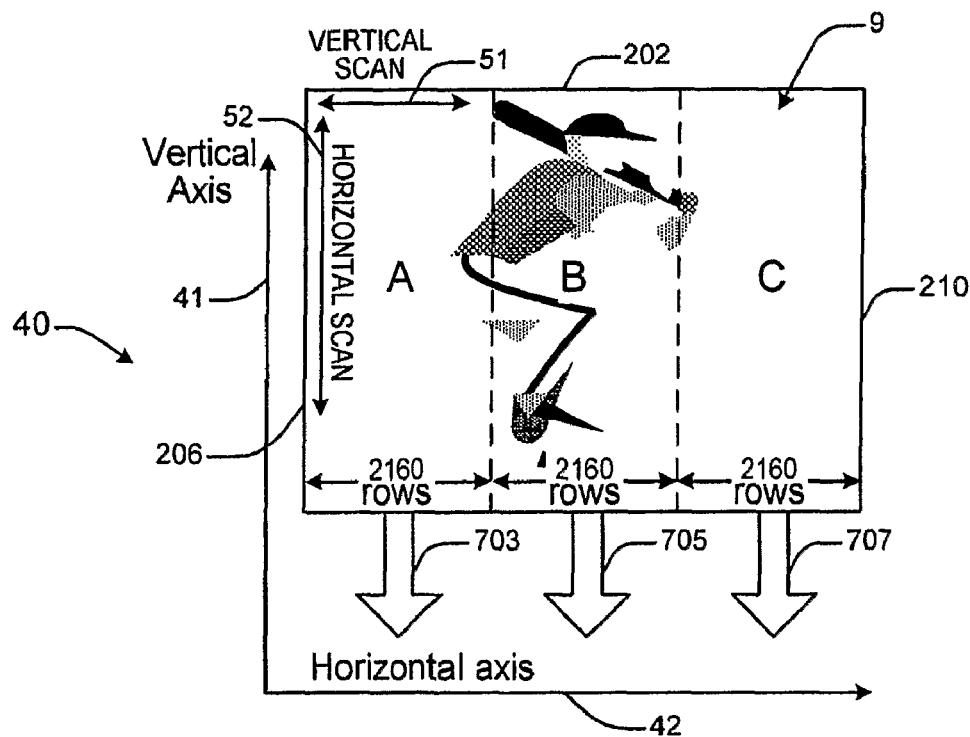
FIG. 4C

IMAGER AND IMAGING METHOD FOR DIGITAL CINEMATOGRAPHY

CROSS-REFERENCE TO RELATED APPLICATIONS

This application claims the benefit, under 35 U.S.C. §365 of International Application PCT/US2006/048217, filed Dec. 18, 2006, which was published in accordance with PCT Article 21(2) on Jul. 5, 2007 in English and which claims the benefit of U.S. provisional patent application No. 60/751,336, filed Dec. 16, 2005.

FIELD OF THE INVENTION

The invention relates generally to television cameras and more particularly to high definition solid-state imagers for use in digital cinema television cameras.

BACKGROUND OF THE INVENTION

Television cameras produce an optical image of an object on an imaging area of a solid-state imaging device. The imaging area is typically defined by an array comprising rows and columns of photo-elements. The camera scans the charges on the photo-elements at a scanning frequency. The camera converts the charges to an electrical signal representing an image of the object. The scanning frequency corresponds to the television system employed. For example., in the NTSC system a scanning frequency of 60 fields/sec is employed.

Solid-state devices employed in imaging devices include Charge Coupled Devices (CCD) and Complementary Metal Oxide Semiconductor (CMOS) devices. Recently active pixel sensors (APS) comprising CMOS transistors have been employed. An active pixel sensor (APS) is an image sensor comprising an integrated circuit including an array of pixels. Each pixel comprises a photo-detector as well as three or more transistors. Since it can be produced by an ordinary CMOS manufacturing process APS is emerging as an inexpensive alternative to CCDs.

The resolution of images obtained with conventional solid state imaging devices is limited by the rate at which the camera can scan the imaging area. The more pixels in the imaging area the more time is needed to "readout" the array. For moving images imager readout rates limit the number of pixels comprising displayed images. At the same time larger screens demand more pixels to adequately represent imaged objects. There is a need for high resolution imagers capable of representing objects with a large number of imaging elements (pixels) without increasing the time required to readout the charges from the array of imaging elements.

BRIEF DESCRIPTION OF THE DRAWINGS

FIGS. 4A-4C illustrate an imager according to an embodiment of the invention including horizontal and. vertical scan directions with respect to horizontal and vertical axes of a Viewing plane.

DETAILED DESCRIPTION OF THE INVENTION

FIG. 1

Figure 1:
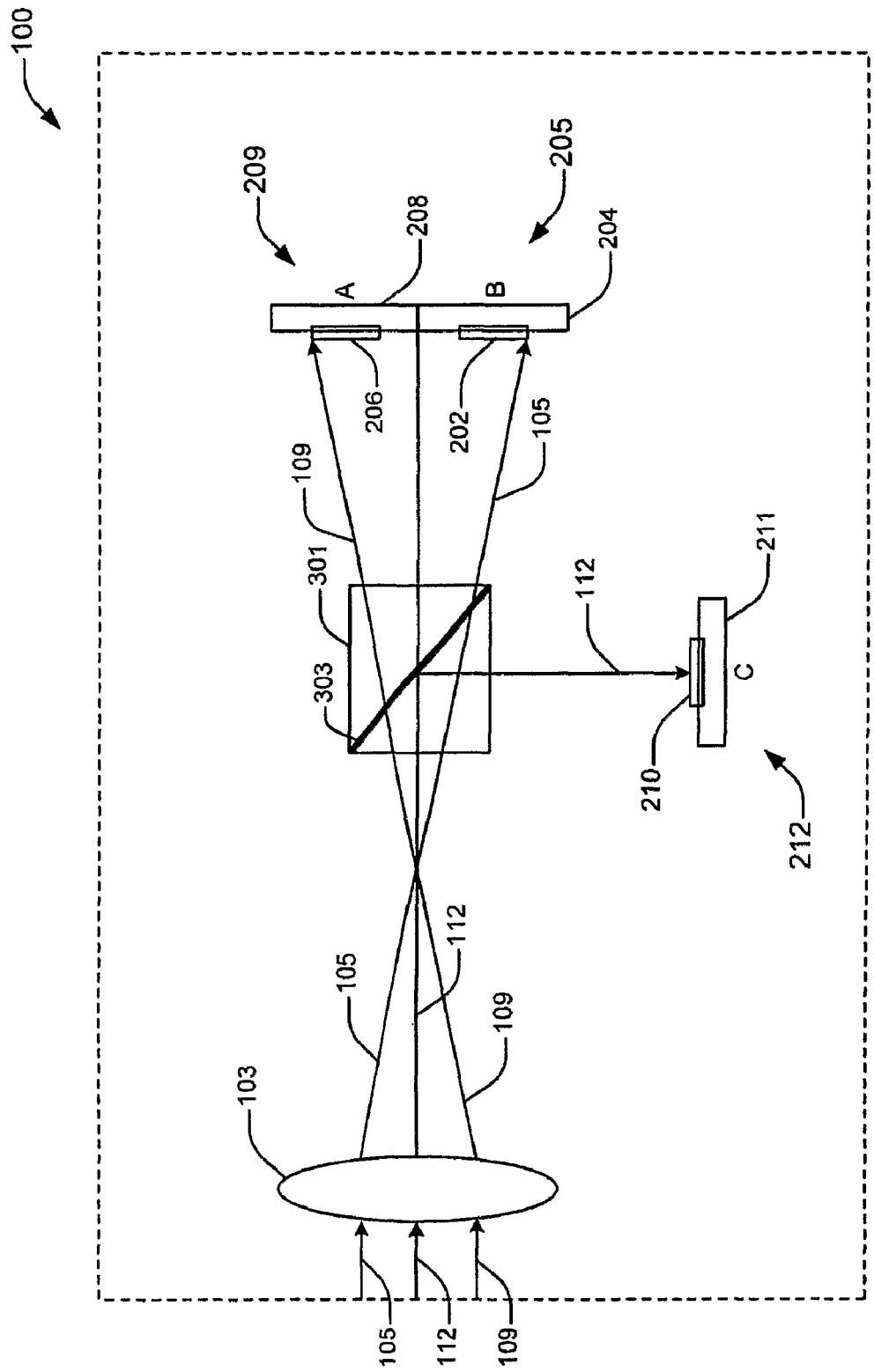
FIG. 1 illustrates an imager 100 according to an embodiment of the invention.

FIG. 1 illustrates an imager 100 according to an embodiment of the invention. Imager 100 comprises three video image sensor packages (209, 205 and 212). Each image sensor package comprises photo-sensing elements arranged in an array (206, 202, 210). Each array (206, 202, 210) is disposed on a respective substrate (208, 204, 211). Imager 100 further comprises a lens 103 and an optical beam splitter 301. Conventional circuits and components comprising imager 100 according to embodiments of the invention are not illustrated in FIG. 1 for ease of discussion of the invention.

Imager 100 forms an optical image of an object 9 (illustrated, for example in FIG. 3). For purposes of this specification the term "object" refers to an object or objects comprising a scene to be captured by the imager for subsequent display to a viewer on a display device. Lens 103 focuses light from object 9 (represented generally by lines 105, 112 and 109) onto photoelements of arrays 206, 202 and 210 of sensor packages 209, 205 and 212. A beam splitter 301 directs light from respective portions of object 9 onto corresponding respective arrays 206, 202 and 210. Each array forms an optical image corresponding to a portion of object 9.

Sensor packages (209, 205 and 212) suitable for use in various embodiments of the invention include CMOS type devices, CCD type devices and Active Pixel Sensing (APS) type devices. These devices convert the optical images provided by photosensing elements of arrays (206, 202, 210) formed on a semiconductor substrate to an electrical charge and store the electrical charge. The charges stored by the arrays are read out at a predetermined frequency by a scanning circuit. The charges form video signals representing the optical images.

FIG. 2

Figure 2:
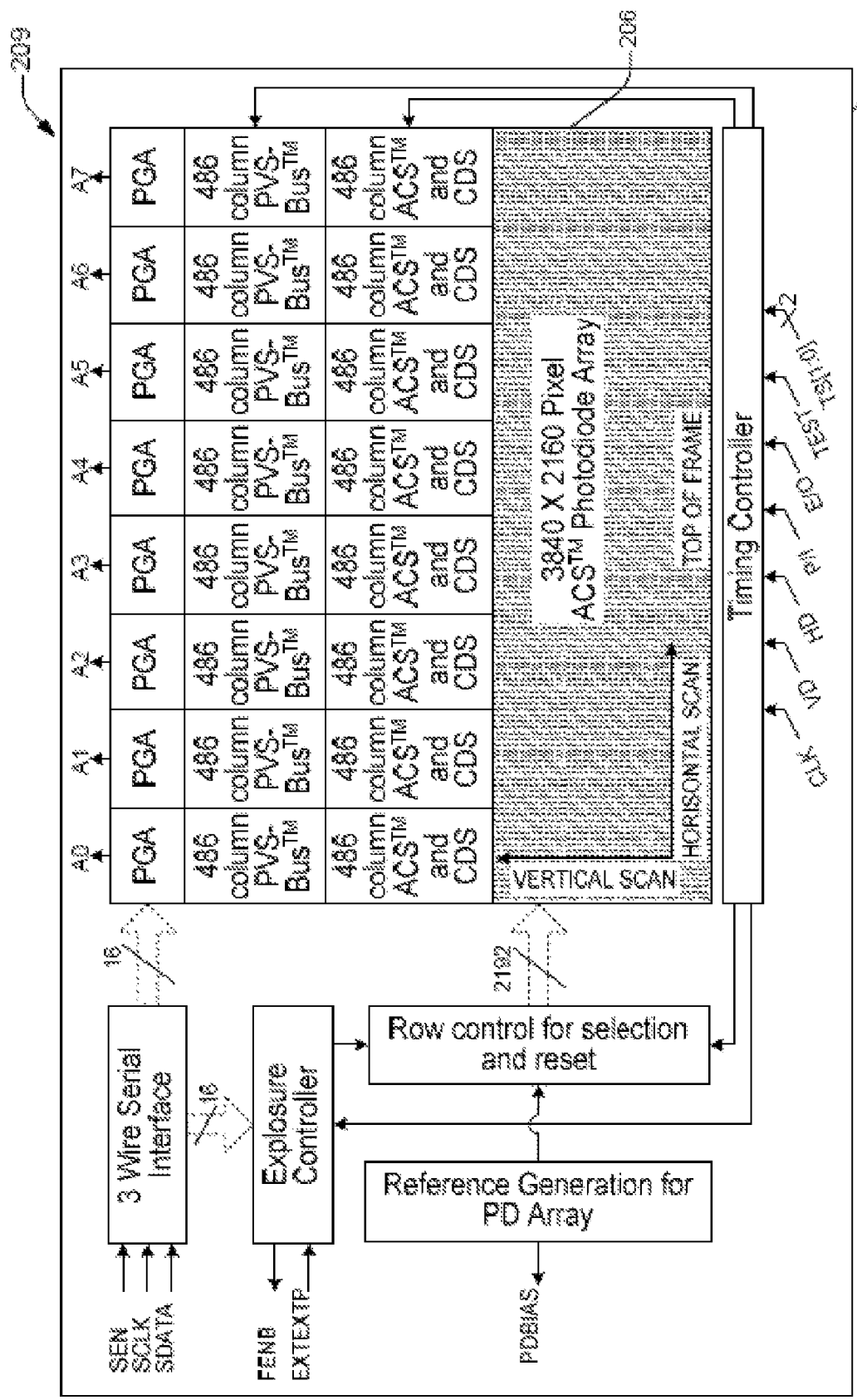
FIG. 2 illustrates a conventional video image sensor suitable for use in embodiments of the invention.

FIG. 2 illustrates a conventional video image sensor suitable for use in embodiments of the invention. The sensor illustrated in FIG. 2 is a QuadHD™ high resolution video sensor commercially available from Panavision SVI, LLC, NY. The QuadHD sensor is a multimode video image sensor capable of operating in either progressive or interlaced modes at frame rates as high as 30 fps. Sensor 208 comprises a 3840 by 2160 pixel photodiode array integrated with an RGB Bayer color filter array and microlenses. The QuadHD sensor includes a 3840 by 32 optical black pixel sub-array at the top of each frame for a total of 3840 by 2192 pixels per frame (>8.4 Megapixels per frame).

According to one embodiment of the invention array 206 is suitable for a broad range of applications including digital cinema, broadcast video and security/surveillance. The imager of the invention employing QuadHD sensors according to one embodiment comprises standard 0.5 µm CMOS technology using double-poly and triple metal (DP3M) construction and features a pixel size of 7.5 µm by 7.5 µm. According to this embodiment the dimensions of array 206 are 16.2 mm by 28.8 mm. The image array aspect ratio is 16:9 with a diagonal of 33 mm making it suitable for HDTV applications using optics designed for 35 mm still photography.

A high modulation transfer function (MTF) is maintained by utilizing micro lenses along with an RGB Bayer pattern color filter array. The frame rate of 30 frames/s in progressive mode is achieved using the PVS-Bus technology with eight output ports, which corresponds to an overall pixel rate of 248

M-pixel per second. High dynamic range and low fixed pattern noise are achieved by combining photodiode pixels with the ACS pixel sensing technology and a modified correlated double-sampling (CDS) technique.

Exposure time can be programmed by the user from a full frame of integration to as low as a single line of integration in steps of 14.8 μs. The output gain is programmable from 0 dB to +12 dB in 256 steps; the output offset is also programmable over a range of 765 mV in 256 steps. A prototype QuadHD camera operates at 2160p24, 2160p30 and 2160i60.

As illustrated in FIG. 2. each of eight video outputs A0-A7 represents 486 columns of the 3888 total columns of pixels with each column of the pixel array comprising 2192 pixels. Thus each output represents more than 1 million pixels (1,065,312). According to one embodiment of the invention each column of pixels is processed by a pixel multiplexer, which is followed by a correlated double sampler (CDS) circuit that produces samples of both the integrated photodiode voltage (video) and the photodiode reset voltage (background).

Row controllers 621 are used to select and reset rows of pixels in a sequential manner thereby implementing .a rolling-shutter exposure system. It is also possible to reset the entire array of pixels at once using the Global pixel reset (GPR) input. The integrated exposure controller provides two exposure modes: short mode and long mode. In short mode exposure time is varied linearly from 100% of the frame-time down to less than 1% of the frame-time. In long mode, exposure time is varied from 1 frame-time per image frame to 4095 frame-times plier image frame. The pixels are reset to an internally generated bias voltage, PIDBIAS, which is brought out to two package pins for external decoupling. The integrated timing controller is the master timer for the imager and ensures that row and column events occur at the proper times in addition to synchronizing with the exposure controller.

FIGS. 3A-3C

Figure 3B:
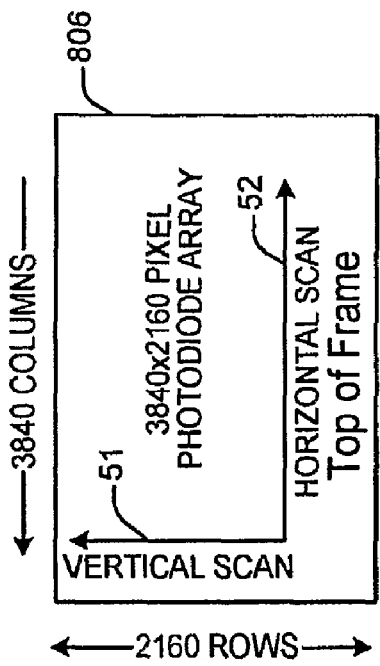
FIGS. 3A-3C illustrate a conventional imager arrangement including horizontal and vertical scan directions with respect to horizontal and vertical axes of a viewing plane.
Figure 3C:
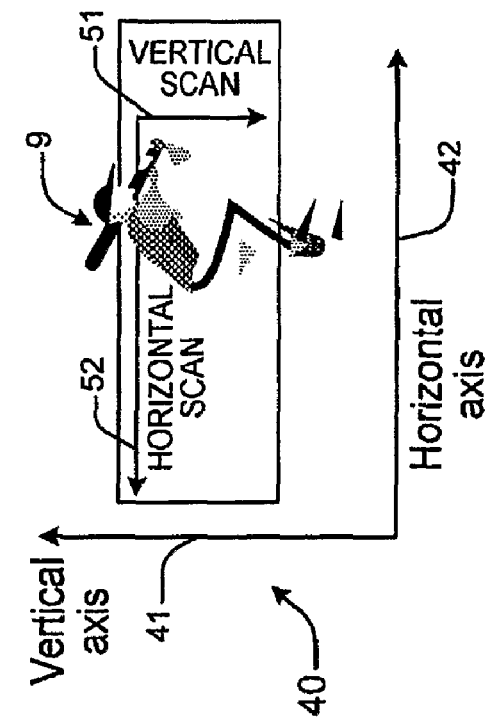
Figure 3A:
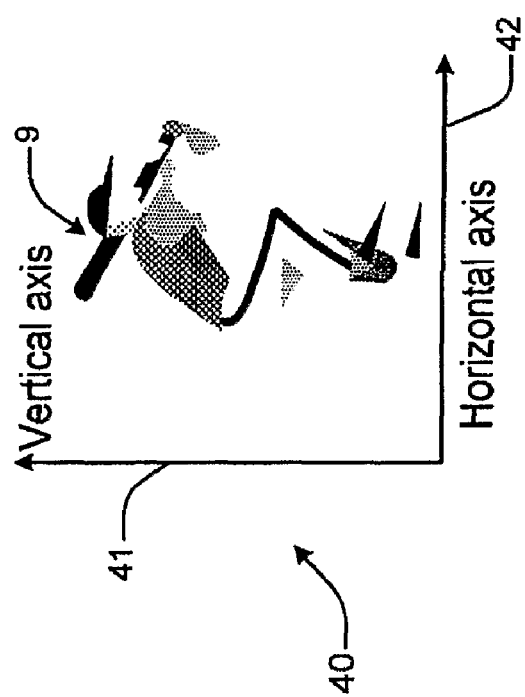

FIG. 3A illustrates a scene 9 oriented in a viewing plane 40. Viewing plane 40 is defined by horizontal axis 42 and vertical axis 41. FIG. 3B illustrates an example array 806 of a conventional video sensor circuit. The example array 806 comprises 3840 columns and 2160 rows of photodiode pixels. The sensor circuits provide a video signal output (not shown) representing an optical image formed on array 806, for example by light from scene 9. The sensor circuits obtain the video signal by scanning columns of array 806 in the direction indicated at 52 to provide a horizontal scan component of the video signal. The sensor circuits scan rows of array 206 to provide a vertical scan component of the video signal. The video signal comprising the horizontal and vertical scan components are provided to a display device (not shown). The display device displays scene 9 by providing video information including the horizontal and vertical scan signals to pixels comprising the display device.

FIG. 3C illustrates array 206 forming an optical image of scene 9 in a conventional manner. Sensor circuits scan array 806 to provide a video signal representing scene 9. The video signal includes a horizontal scan component 52 corresponding to rows of array 806 along direction 52. The video signal includes a vertical scan component corresponding to columns of array 806 along direction 51. FIG. 3C illustrates horizontal scan direction 52 parallel to horizontal axis 42 and vertical scan direction 51 parallel to vertical axis 51. Therefore horizontal and; vertical signal component directions for array 806 correspond respectively to horizontal 42 and vertical 41 axes of viewing plane 40. Therefore the optical image of scene 9 is scanned to provide a video signal comprising horizontal and vertical scan signal components representing scene 9 as a video image having a resolution given by 3840 pixels along the horizontal axis 42 of viewing plane 40 and 2160 pixels along the vertical axis 41 of viewing plane 40.

FIGS. 4A-4C

FIG. 4A illustrates scene: 9 comprising scene portions A, B and C. Scene 9 is oriented in space in a viewing plane 40. Viewing plane 40 is defined by horizontal axis 42 and vertical axis 41. FIG. 4B illustrates an example array 206 of imager 100 (illustrated in FIG. 1) according to an embodiment of the invention. Array 206 and substrate 208 (illustrated in FIG. 1) comprise sensor package 209 (illustrated in FIG. 1). Array 206 is representative of each of the three arrays 206, 202 and 210 of imager 100 according to the embodiment of the invention illustrated in FIG. 1.

Array 206 is defined by 3840 columns and 2160 rows of pixels comprising photodiodes. Sensor package 209 includes circuits for providing a vertical scan 51 component of a video signal corresponding to rows of array 206. A horizontal scan 52 component of a video signal corresponds to columns of array 206.

FIG. 4C illustrates the arrays 206, 202 and 210 of imager 100 illustrated in FIG. 1 and exemplified by the array 206 of FIG. 4B. Imager 100 is configured to provide light comprising image portions A, B and C to arrays 206, 202 and 210 respectively. In contrast with conventional sensor arrangements, arrays 206, 202 avid 210 are arranged such that their vertical scan directions correspond to the horizontal axis 42 of viewing plane 40. Likewise, the horizontal scan directions of arrays 206, 202 and 210 correspond to vertical axis 41 of viewing plane 40. Therefore each image portion, for example image portion A has a resolution defined by 2160 pixels along the horizontal axis of viewing plane 40 and 3840 pixels along the vertical axis of viewing plane 40. Output signals 703, 705 and 707 each comprise horizontal and vertical scan components representing image portions A, B and C of respective corresponding arrays 206, 202 and 210.

As illustrated in FIG. 4C when image portions A, B and C are combined the resulting image of scene 9 has a resolution defined by 6430 pixels along the horizontal axis of viewing plane 40 and 3840 pixels along the vertical axis of viewing plane 40. The imager 100 illustrated in FIGS. 1 and 4A-4C provides a novel practical and cost effective imager capable of providing images having a resolution of 6830×3840 pixels.

FIG. 5

Figure 5:
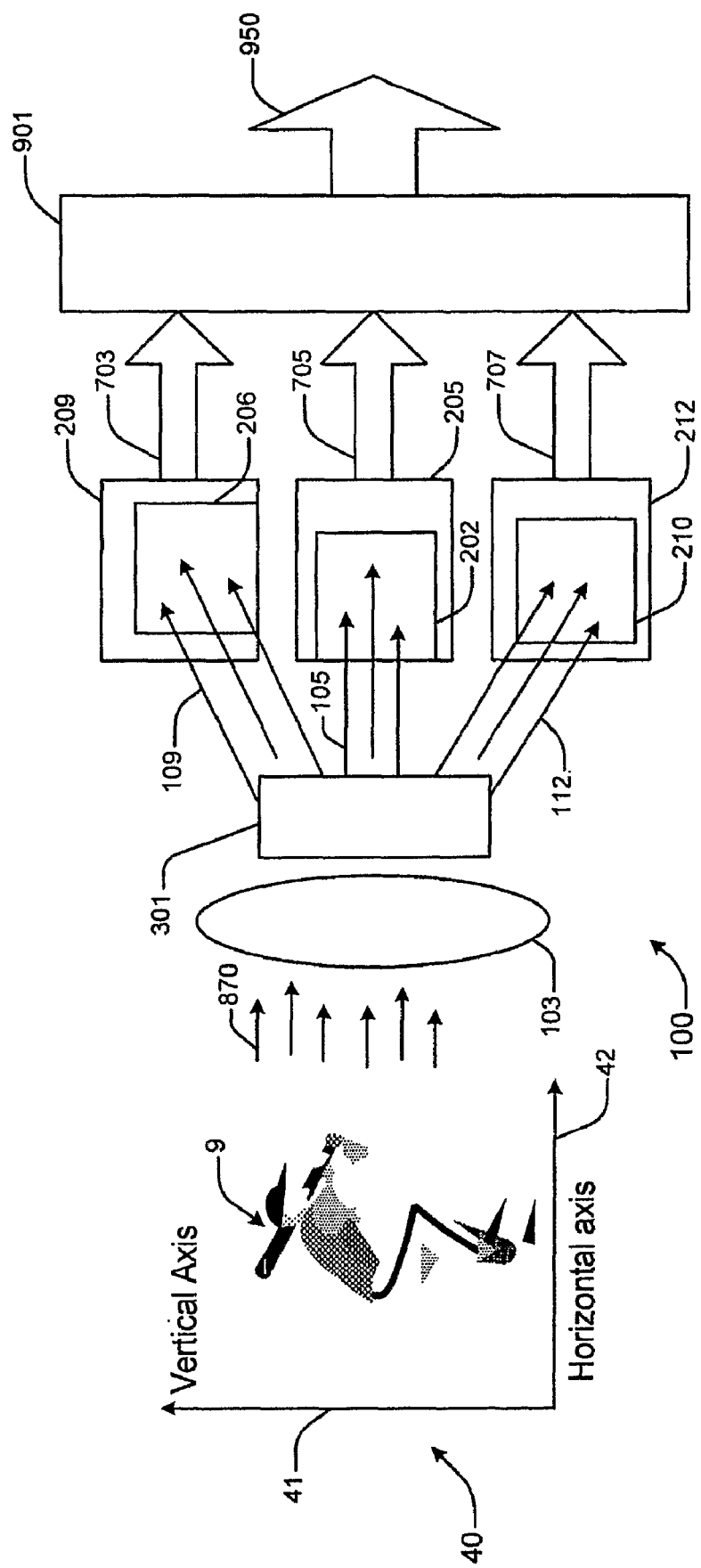
FIG. 5 is a block diagram of an imager according to an embodiment of the invention.

FIG. 5 is a block diagram of imager 100 of FIG. 1. Imager 100 forms, on a plurality of arrays (206, 202 and 210), an optical image of an object 9. Object 9 is oriented in a viewing plane 40 defined by horizontal 42 and vertical 41 viewing axes. To form the image a lens 103 focuses light from object 9 onto arrays 206,202 and 210. Arrays 206, 202 and 210 of imager 100 each comprise a corresponding video image sensor package 209,205 and 212 respectively. Arrays 206, 202 and 210 each comprise arrays of photoelements arranged in rows and columns. Video image sensor packages 209, 205 and 212 are arranged with respect to lens 103 such that rows comprising each array 206, 202 and 210 are aligned along a vertical axis 41 of viewing plane 40. Columns comprising arrays 206, 202 and 212 are aligned along a horizontal axis 42 of viewing plane 40.

An optical image of object 9 is formed on photoelements of arrays 206, 202 and 210. Each sensor package 209, 205 and 212 provides signals 703, 705 and 707 respectively. Each signal comprises a vertical scan component corresponding to columns of a corresponding array and a horizontal scan component corresponding to rows of a corresponding array. In one embodiment of the invention a multiplexer 901 combines signals 703, 705 and 707 to form a video signal 950. In one embodiment of the invention video signal 950 represents images comprising 6430 along a horizontal axis of viewing plane 40 and 3840 pixels along a vertical axis of viewing plane 40.

An optical image of object 9 is formed on photoelements of arrays 206, 202 and 212. Each sensor package 209, 205 and 212 provides signals 703, 705 and 707 respectively. Each signal comprises a vertical scan component corresponding to columns of a corresponding array and a horizontal scan component corresponding to rows of a corresponding array. In one embodiment of the invention a multiplexer 901 combines signals 703, 705 and 707 to form a video signal 950. In one embodiment of the invention video signal 950 represents images comprising 6430 along a horizontal axis of viewing plane 40 and 3840 pixels along a vertical axis of viewing plane 40.

FIG. 6

Figure 6:
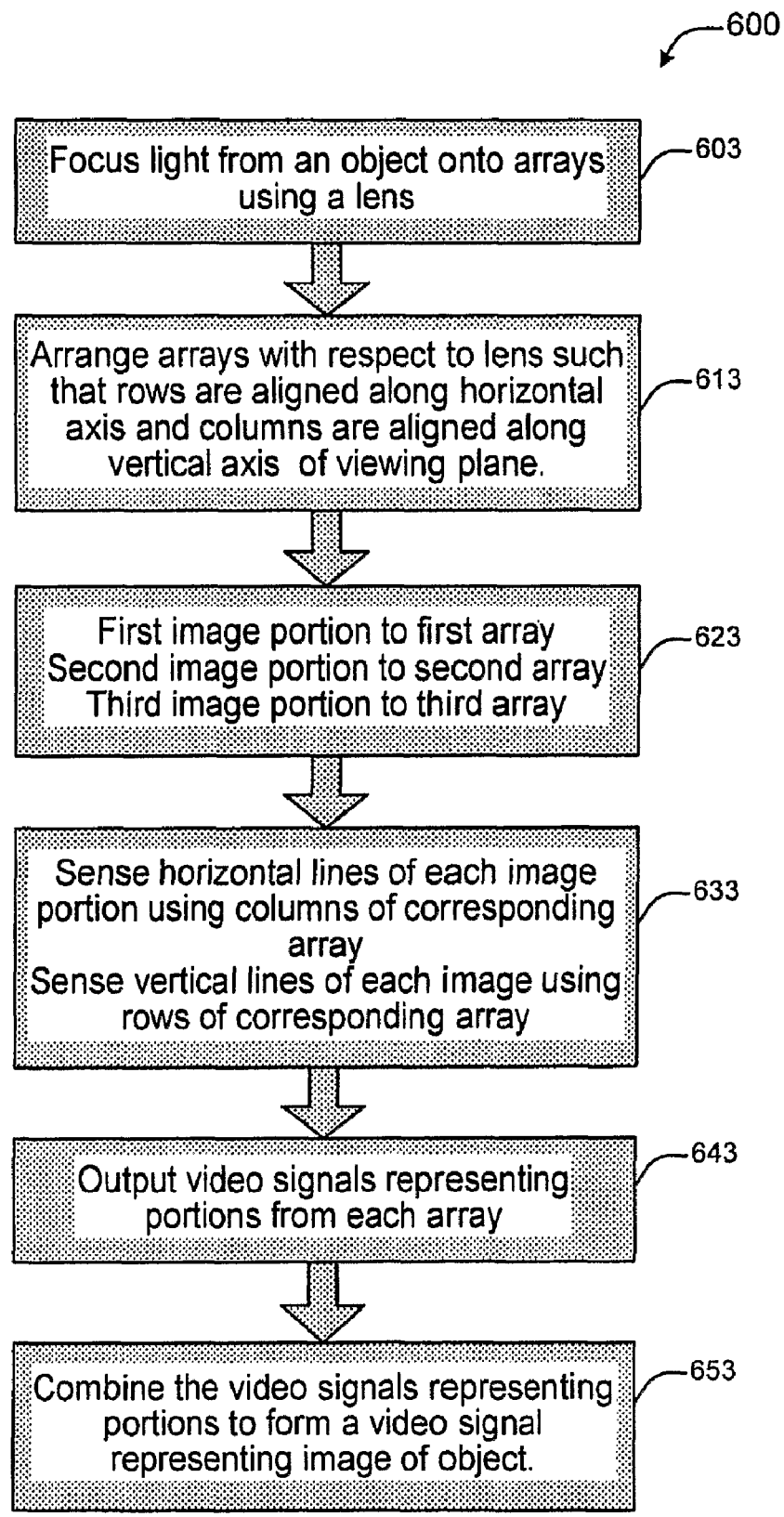
FIG. 6 is a flow chart illustrating steps of a method according to an embodiment of the invention.

FIG. 6 illustrates a method 600 of forming, on a plurality of photoelements, an image of an object 9 lying in a viewing plane 40 defined by horizontal 42 and vertical 41 axes. Arrays of photoelements 206, 202 and 210 comprise rows and columns of photoelements. At step 603 light from object 9 is focused by a lens 103 onto arrays 206, 202 and 210. The method includes a step of arranging arrays 206, 202 and 210 with respect to lens 103 such that rows are aligned along a horizontal axis 42 of viewing plane 40 and columns are aligned along a vertical axis 41 of viewing plane 40. Thus an image of object 9 is formed on said photo-elements. According to an embodiment of the invention the image has a resolution of 6430 pixels by 2160 pixels.

In one embodiment of the invention the method includes a step 623 of providing a first image portion of object 9 to a first array, a second image portion of object 9 to a second array and a third image portion to a third array. According to an embodiment of the invention method 600 includes a further step 633 of sensing horizontal lines of the each image portion by columns of each corresponding array, and sensing vertical lines of each image portion by rows of each corresponding array.

At step 643 a plurality of output signals representing respective image portions are provided. At step 653 the output signals representing respective image portions are combined to form a video signal comprising an image of object 9.

The invention claimed is:

1. An imager comprising:
   first, second and third video image sensors, each video image sensor comprising an array of photo-elements, the photo-elements being arranged in rows and columns to define vertical and horizontal pixel resolutions for each said array;
   a lens for focusing a portion of light from an object in a viewing plane onto each said array, each said array forming an image corresponding to a portion of said object;
   said video image sensors all being arranged with respect to said lens such that said rows are aligned along vertical axis of said viewing plane and said columns are aligned along a horizontal axis of said viewing plane;
   wherein the first, second and third video image sensors are each configured such that their vertical scan directions correspond to a horizontal axis of the viewing plane; and
   said video image sensors forming a collective optical image of said object having a horizontal pixel resolution representative of a combination of individual vertical pixel resolutions of said video image sensors.

2. The imager of claim 1 further comprising:
   a circuit for scanning said rows of said sensors to obtain horizontal scan portions of a video signal representing said object;
   a circuit for scanning said columns to provide vertical scan portions of said video signal representing said object.

3. The imager of claim 1 comprising first, second and third image sensors are arranged with respect to said lens to receive first, second and third image portions respectively, said sensors providing first, second and third video signal portions representing said first second and third image portions respectively.

4. The imager of claim 3 further comprising a multiplexer for combining said first, second and third video signal portions to provide said video image signal.

5. A method of forming, on a plurality of photoelements, an image of an object lying in a viewing plane defined by horizontal and vertical axes comprising steps of:
   arranging said photoelements to provide first, second and third sensor arrays, each sensor array comprising rows and columns of photoelements;
   focusing light from said object onto said photoelements; and
   arranging said sensor arrays with respect to said lens such that said first and second sensor arrays are positioned in a plane perpendicular to the axis of said lens, and said third sensor array is positioned in a plane parallel to the axis of said lens; wherein said rows are all aligned along said vertical axes, and said columns are aligned along said horizontal axes, so said sensor arrays capture a collective optical image of said object having a horizontal pixel resolution representative of a combination of individual vertical pixel resolutions of said video image sensors when scanning the first, second and third video image sensors such that their vertical scan directions correspond to a horizontal axis of the viewing plane.

6. The method of claim 5 further including steps of:
   scanning said rows to provide a horizontal component of a video signal representing said object; and
   scanning said columns to provide a vertical component of a video signal representing said object.

7. The method of claim 5 wherein the step of focusing light is carried out by:
   focusing light from a first portion of said object onto said first sensor array;
   focusing light from a second portion of said object onto said second sensor array; and
   focusing light from a third portion of said object onto said third sensor array.

8. The method of claim 7 further including steps of:
   combining outputs of said first, second and third sensors arrays to provide a video signal representing said object.

9. The imager of claim 1 wherein said first and second video image sensors are positioned in a first plane and said third video image sensor is positioned in a second plane perpendicular to said first plane.

10. An imager comprising:
    at least first and second video image sensors, each video image sensor comprising an array of photo-elements, the photo-elements being arranged in rows and columns to define vertical and horizontal pixel resolutions for each said array;
    resolution for each said array;
    a lens for focusing a portion of light from an object in a viewing plane onto each said array of each image sensor, each said array forming an image corresponding to a portion of said object;

said video image sensors being arranged with respect to said lens such that said rows of said array of photo-elements are aligned along vertical axis of said viewing plane and said columns of said array of photo-elements are aligned along a horizontal axis of said viewing plane;

wherein the at least first and second video image sensors are each configured such that their vertical scan directions correspond to a horizontal axis of the viewing plane; and said video image sensors forming a collective optical image of said object having a horizontal pixel resolution representative of a combination of individual vertical pixel resolutions of said video image sensors.

\* \* \* \* \*